United States Patent
Ishikawa et al.

[11] Patent Number: 5,478,092
[45] Date of Patent: Dec. 26, 1995

[54] METAL LAMINATE GASKET WITH EDGE SUPPORT BEADS

[75] Inventors: Itsuo Ishikawa, Tokyo; Tsunekazu Udagawa, Ichikawa, both of Japan

[73] Assignee: Ishikawa Gasket Co., Ltd., Tokyo, Japan

[21] Appl. No.: 401,496

[22] Filed: Mar. 10, 1995

Related U.S. Application Data

[63] Continuation-in-part of Ser. No. 98,004, Jul. 29, 1993, Pat. No. 5,427,389.

[30] Foreign Application Priority Data

Jul. 31, 1992 [JP] Japan ......................... 4-59500

[51] Int. Cl.⁶ ......................................................... F16J 15/08
[52] U.S. Cl. .................................. 277/235 B; 277/236
[58] Field of Search ............................. 277/235 B, 18 C, 277/236, 233, 207 R, 210

[56] References Cited

U.S. PATENT DOCUMENTS

| | | | |
|---|---|---|---|
| 4,834,399 | 5/1989 | Udagawa et al. | 277/235 B |
| 5,199,723 | 4/1993 | Udagawa | 277/235 B |
| 5,269,541 | 12/1993 | Inamura | 277/235 B |
| 5,427,389 | 6/1995 | Ishikawa et al. | 277/235 B |

FOREIGN PATENT DOCUMENTS 0177363  8/1987  Japan ............................ 277/235 B

*Primary Examiner*—Daniel G. DePumpo
*Attorney, Agent, or Firm*—Kanesaka & Takeuchi

[57] ABSTRACT

A metal laminate gasket of the invention is used for an internal combustion engine formed of a cylinder head and a cylinder block. The gasket is basically formed of two metal plates laminated together. The gasket has a rectangular shape extending in a longitudinal direction, and two lateral side portions, each being defined between a lateral edge and a line linking centers of bolt holes located adjacent to the lateral edge. At least two edge support beads are integrally formed in at least one of the plates. The bead has a V shape opening toward the lateral edge. Thus, the lateral side portions are widely supported to thereby prevent deformation of the cylinder head and provide substantially equal tightening pressure around the entire cylinder bores.

4 Claims, 1 Drawing Sheet

METAL LAMINATE GASKET WITH EDGE SUPPORT BEADS

CROSS-REFERENCE TO RELATED APPLICATION

This is a continuation in part application of Ser. No. 08/098,004 filed on Jul. 29, 1993 now U.S. Pat. No. 5,467,389.

BACKGROUND OF THE INVENTION AND RELATED ART STATEMENT

The present invention relates to a metal laminate gasket with edge support beads to prevent upward expansion or deformation of a cylinder head of an engine.

In an engine having a plurality of cylinder bores arranged in one or a longitudinal direction, a plurality of bolt holes are arranged to surround the respective cylinder bores to tightly seal therearound. A gasket to be installed in this engine includes a plurality of sealing means around the cylinder bores, at which high surface pressure is formed when the gasket is tightened.

When the gasket is tightened between a cylinder head and a cylinder block by bolts, sealing means situated around the respective cylinder bores are compressed. In this respect, a bolt located in a middle portion of the engine operates to tighten two, i.e. right and left, longitudinal sides of the sealing means relative to the bolt. However, a bolt at the longitudinal end of the engine operates to tighten only one side of the sealing means, not two sides. Thus, the bolts at the longitudinal ends operate to tighten the sealing means at a pressure generally twice as much as that at the middle portion of the sealing means.

The unbalanced tightening pressure causes the middle portion of the cylinder head to project upwardly. As a result, equal sealing pressure is not obtained at the sealing means.

In U.S. Pat. No. 4,834,399, a bead is formed around the entire edge portion of the gasket. However, since the bead completely surrounds the edge portion of the gasket, the bead supports all the surface pressure applied by the bolts. Namely, the bead does not support required portions.

Accordingly, one object of the invention is to provide a metal laminate gasket, which can provide wide supporting portions at the lateral side portions of the gasket to prevent deformation of a cylinder head.

Another object of the invention is to provide a metal laminate gasket as stated above, which can provide substantially equal surface pressure to all sealing means formed around the cylinder bores when the bolts are tightened.

A further object of the invention is to provide a metal laminate gasket as stated above, wherein compression resistance of the supporting portion increases from a portion near a cylinder bore to the lateral edge at the lateral side portion.

A still further object of the invention is to provide a metal laminate gasket as stated above, which can be easily and economically manufactured.

Further objects and advantages of the invention will be apparent from the following description of the invention.

SUMMARY OF THE INVENTION

In accordance with the present invention, a metal laminate gasket is used for an internal combustion engine formed of a cylinder head and a cylinder block. The gasket is basically formed of two metal plates laminated together.

The gasket has a rectangular shape, and includes a plurality of cylinder bores arranged along a longitudinal direction of the gasket, and a plurality of bolt holes arranged to surround the cylinder bores. The gasket has two lateral side portions, each being defined between the lateral edge and a line linking the centers of bolt holes located adjacent to the lateral edge.

In the invention, at least two edge support beads are integrally formed in at least one of the two plates, and at least one edge support bead is located in the lateral side portion to substantially completely support tightening pressure of the bolts applied to the lateral side portion. The bead has two end portions and a middle portion, and is bent at the middle portion. The end portions are located near the lateral edge, and the middle portion is located near the cylinder bore. Thus, the lateral side portion is widely supported by the support bead to thereby prevent deformation of the cylinder head and provide substantially equal tightening pressure around the entire cylinder bores.

In the invention, since the bead is bent, i.e. V-shape, and the end portions of the bead are located near the lateral edge, the compression resistance of the bead increases from a portion near a cylinder bore to the longitudinal edge. Thus, when the gasket is tightened, the support bead strongly supports the cylinder head at the lateral edge to help prevent the deformation of the cylinder head.

In this respect, if the edge support beads are not formed at the lateral side portions, the lateral side portions are strongly compressed by the bolts. Thus, the middle portion of the cylinder head is liable to project upwardly. Accordingly, the sealing means for the cylinder bores can not be compressed equally, and gas leakage may occur.

In the present invention, since the deformation of the cylinder head is well prevented, the sealing means can be substantially completely compressed. Gas leakage is well prevented.

Two or more edge support beads may be arranged side by side in the respective lateral side portions to support substantial areas thereof. When an additional or second bead is further used, the second bead is arranged in the direction opposite to the support bead. The second bead may be sandwiched between the support beads, but one support bead may be sandwiched between the two second beads.

In the present invention, the beads may be formed in only one metal plate, or formed in different plates. It is important that the beads are located widely at the lateral side portions. If the bead extend outside the lateral side portion, such bead affects the sealing means, so that the sealing means can not provide equal surface pressure around the cylinder bores. The edge support beads of the invention are formed at portions affected only by bolt at lateral side portions of the gasket.

DETAILED DESCRIPTION OF PREFERRED EMBODIMENTS

Figure 1:
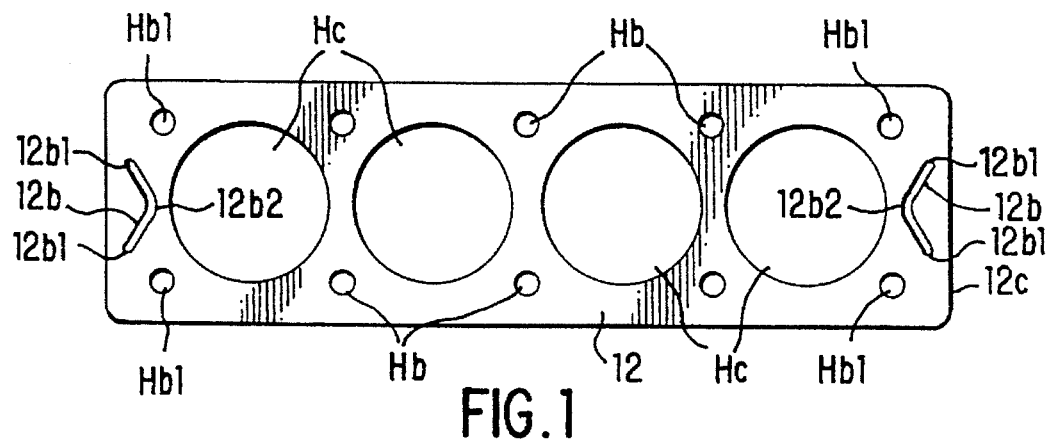
FIG. 1 is an explanatory plan view of a first embodiment of a metal plate for constituting a metal laminate gasket of the invention.
Figure 2:
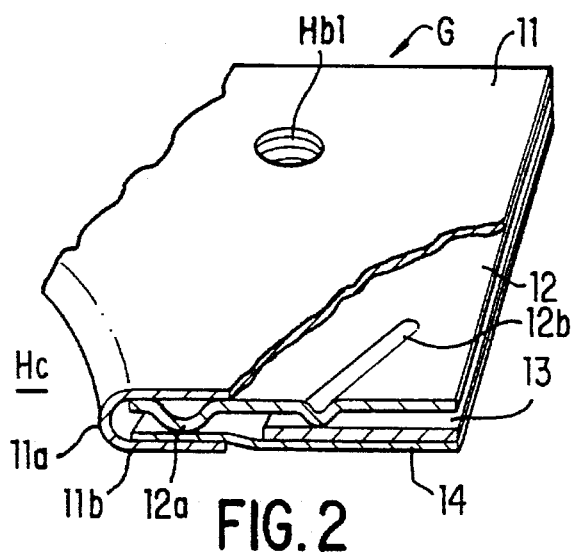
FIG. 2 is a partly cut perspective section view of a metal laminate gasket including the metal plate of FIG. 1.

Referring to FIGS. 1 and 2, a metal laminate gasket G of the invention is shown. The gasket G is a cylinder head gasket and includes four cylinder bores Hc, water holes (not shown), oil holes (not shown), bolt holes Hb, Hb1, and so on, as in the conventional gasket.

The gasket G is formed of an upper plate 11, middle plates 12, 13, and a lower plate 14. The upper plate 11 includes a curved portion 11a and a flange 11b around the cylinder bore Hc, and the middle plate 12 includes a sealing bead 12a around the cylinder bore Hc (the bead 12a is omitted in FIG. 1). When the gasket G is situated between a cylinder head and a cylinder block (both not shown) and is tightened, the bead 12a is compressed to seal around the cylinder bore Hc.

In the gasket G, the cylinder bores Hc are arranged along a longitudinal direction, and the bolt holes Hb, Hb1 are arranged to surround the cylinder bores Hc. In this engine, when the gasket G is tightened, each bolt (not shown) inserted in the bolt hole Hb provides surface pressure for sealing portions of two cylinder bores, while each bolt (not shown) inserted in the bolt hole Hb1 provides surface pressure for sealing a portion of only one cylinder bore.

If the gasket is tightened at the same torque by the bolts, the surface pressure formed around the bolt hole Hb becomes nearly half of the surface pressure formed around the bolt hole Hb1. Namely, the two lateral side portions of the cylinder head gasket are tightened stronger than the middle portion of the gasket.

In the above case, the middle portion of the cylinder head has a space relative to the cylinder block greater than that at the lateral side portions of the cylinder head. Namely, the middle portion of the cylinder head projects slightly upwardly. Since the cylinder head deforms slightly as stated above, the sealing means for the cylinder bores can not receive equal surface pressure.

In the present invention, in order to provide equal surface pressure even at the bolts around the bolt holes Hb1, the middle plate 12 is provided with edge support beads 12b at the lateral side portions of the gasket G. The lateral side portion is a portion surrounded between an edge 12c and a line linking between two bolt holes Hb1 near the edge 12c.

The edge support bead 12b includes end portions 12b1, and a middle portion 12b2. The end portions 12b1 incline relative to the middle portion 12b2 to form a V-shape opening toward the edge 12c. In the gasket G, the edges 12c generally receive large force, and when an engine with the gasket G operates, the edges 12c are liable to vibrate or bend.

However, in the invention, the beads 12b widely support the lateral side portion in the longitudinal direction. Thus, the deformation of cylinder head and the vibration of the edges 12c are surely reduced. Especially, since the end portions 12b1 extend near the edge 12c where the gasket vibrates or bends severely, the tightening pressure by the bolts are properly supported, so that the vibration or bending of the gasket is reduced significantly.

Since the edge support beads 12b are located at the lateral side portions, the tightening pressure by the bolts in the bolt holes Hb1 is applied to the edge support beads 12b as well as the sealing beads 12a. Therefore, the surface pressure by the bolts in the bolt holes Hb1 can provide the surface pressure as in the other portions.

in the invention, since the cylinder head is not strongly tightened at the lateral side portions thereof, the cylinder head does not deform such that the middle portion projects upwardly. Thus, the sealing means can be compressed substantially equally. Gas leakage does not occur by unbalanced surface pressure of the sealing means.

Figure 3:
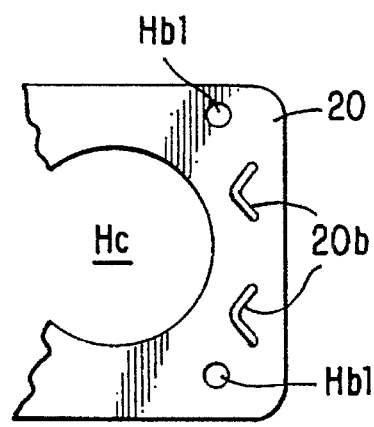
FIGS. 3–5 are plan views of second to fourth embodiments of metal plates for constituting the gaskets of the invention.

FIG. 3 shows a metal plate 20 similar to the plate 12 shown in FIGS. 1 and 2. The plate 20 includes two edge support beads 20b at each lateral side portion of the plate 20. Each edge support bead 20b has a V-shape similar to the edge support bead 12b, but is made smaller than the bead 12b. The beads 20b are arranged side by side in the lateral side portion. Since two beads 20b are situated in the lateral side portion, the beads 20b can widely support the force applied to the lateral side portion. Especially, the area near the lateral edge of the plate 20 can be supported by the end portions of the beads 20b.

Figure 4:
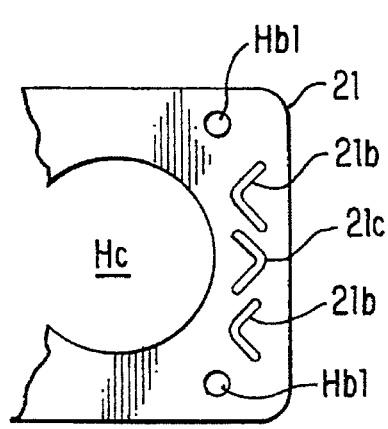

FIG. 4 shows a metal plate 21, similar to the metal plate 20 as shown in FIG. 3. The metal plate 21 includes two edge support beads 21b, and an additional bead 21c between the beads 21b. The beads 21b open toward the lateral edge, but the bead 21c opens toward the cylinder bore Hc. The beads 21b, 21c can widely support the lateral side portion.

Figure 5:
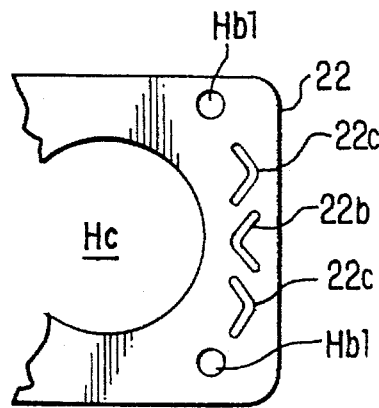

FIG. 5 shows a metal plate 22, similar to the metal plate 21. The metal plate 22 includes one edge support bead 22b, and two additional beads 22c. The bead 22b opens toward the lateral edge, but the beads 22c open toward the cylinder bore Hc. The beads 22b, 22c can widely support the lateral side portion.

The metal plates as shown in FIGS. 3–5 are combined with one or more metal plates to constitute the metal laminate gasket, as in the gasket G shown in FIGS. 1 and 2.

In the present invention, the lateral side portions of the gasket can be sufficiently supported by the edge support beads. Thus, deformation of the cylinder head is prevented, and the sealing means around the cylinder bores are equally compressed to securely seal therearound.

While the invention has been explained with reference to the specific embodiments of the invention, the explanation is illustrative, and the invention is limited only by the appended claims.

What is claimed is:

1. A metal laminate gasket for an internal combustion engine formed of a cylinder head and a cylinder block, comprising:

at least two metal plates laminated together and extending substantially throughout an entire area of the engine for constituting the metal laminate gasket, said gasket including two longitudinal edges, two lateral edges perpendicular to the longitudinal edges to form a rectangular shape, a plurality of cylinder bores arranged along a longitudinal direction of the gasket, and a plurality of bolt holes arranged to surround the cylinder bores, said gasket having lateral side portions, each being defined between the lateral edge and a line linking centers of bolt holes located adjacent to the lateral edge, and at least two edge support beads integrally formed in at least one of the two plates, at least one edge support bead being located in the lateral side portion to substantially support tightening pressure of the bolts applied to the lateral side portion, said bead having two end portions and a middle portion and being bent at the middle portion so that the end portions are located near the lateral edge and the middle portion is located near the cylinder bore for widely supporting the lateral side portion to thereby prevent deformation of the cylinder head and provide substantially equal tightening pressure around the entire cylinder bores.

2. A metal laminate gasket according to claim 1, wherein at least two edge support beads are arranged side by side in the lateral side portion to support a substantial area thereof.

3. A metal laminate gasket according to claim 2, wherein the end portions of the two beads face the lateral edge, said gasket further including a second bead having a shape as in the edge support bead, said second bead being arranged between the two edge support beads and oriented in a direction opposite to the edge support bead.

4. A metal laminate gasket according to claim 1, further comprising a second bead having a shape as in the edge support bead, said second bead being arranged to sandwich the edge support bead and oriented in a direction opposite to the edge support bead.

* * * * *